United States Patent
Sharma (10) Patent No.: US 8,434,066 B2
(45) Date of Patent: Apr. 30, 2013

(54) ENABLING A BUSINESS ENTITY TO VALIDATE SUPPORT FOR SPECIFIC ACTIVITIES IN A CRM SYSTEM BEFORE MIGRATION FROM EARLIER VERSIONS

(75) Inventor: Sanjay Sharma, Shivpuri (IN)

(73) Assignee: Oracle International Corporation, Redwood Shores, CA (US)

( * ) Notice: Subject to any disclaimer, the term of this patent is extended or adjusted under 35 U.S.C. 154(b) by 994 days.

(21) Appl. No.: 12/481,604

(22) Filed: Jun. 10, 2009

(65) Prior Publication Data

US 2009/0313608 A1 Dec. 17, 2009

(30) Foreign Application Priority Data

Jun. 12, 2008 (IN) .......................... 1431/CHE/2008

(51) Int. Cl.
*G06F 9/44* (2006.01)
(52) U.S. Cl.
USPC ............ 717/126; 717/168; 717/170; 717/175
(58) Field of Classification Search .................. 717/126, 717/175
See application file for complete search history.

(56) References Cited

U.S. PATENT DOCUMENTS

| | | | | |
|---|---|---|---|---|
| 5,335,342 | A * | 8/1994 | Pope et al. ................. | 714/38.13 |
| 6,898,764 | B2 * | 5/2005 | Kemp ........................... | 715/762 |
| 7,124,401 | B2 * | 10/2006 | Muller et al. ................. | 717/124 |
| 2003/0202012 | A1 * | 10/2003 | Kemp ........................... | 345/762 |
| 2005/0149543 | A1 * | 7/2005 | Cohen et al. ................ | 707/100 |
| 2005/0198630 | A1 * | 9/2005 | Tamma et al. ............... | 717/175 |
| 2005/0203975 | A1 * | 9/2005 | Jindal et al. .................. | 707/204 |
| 2008/0120333 | A1 * | 5/2008 | Sethi ........................... | 707/103 R |

OTHER PUBLICATIONS

"IBM Content Management Information Center—Validating Migration Results With the Post-Migration Validation Utility", "http://publib.boulder.ibm.com/infocenter/cmgmt/v8r3m0/index.jsp?topic=/com. ibm.migratingcm.doc/icmcmmst51.htm", Downloaded Circa: Feb. 6, 2008, pp. 1-6.
"Oracle Database Migration Verifier", "http://www.oracle.com/technology/tech/migration/dmv/index.html", Downloaded Circa: Feb. 6, 2008, pp. 1-2.
"Oracle Corporation", "Oracle Migration Workbench White Paper", Dated: Jun. 2004, pp. 1-9.

* cited by examiner

*Primary Examiner* — Wei Zhen
*Assistant Examiner* — Brahim Bourzik
(74) *Attorney, Agent, or Firm* — Narendra Reddy Thappeta (57) ABSTRACT

An aspect of the present invention enables users (belonging to a business entity) to validate support for specific activities in a customer relationship management (CRM) system before migration from earlier versions. In one embodiment, the differences between the earlier version and the later version of the CRM system are first identified. An application based on the identified differences is then implemented, with the application designed to demonstrate how activities according to the earlier version would be operative in the later version. The application is provided with an input data representing a first activity (according to the earlier version) and executed to demonstrate how the first activity would be operative in the later version of the CRM system. A user may then inspect an output (e.g., user interfaces related to the first activity) of execution of the application to validate support for the first activity.

13 Claims, 6 Drawing Sheets

CRM Application

Tabs: Home | Marketing Calendar | Marketing Plans | Programs | Segments | Marketing Analytics | Offers

Sub-tabs: All offers | Offer Groups | Direct mail Treatments | Email Treatments | Phone Treatments | Fax Treatments | Media Treatments

Email Treatments

[New] [Delete] [Query]     1 – 10 of 10+

| Name | Description | Offer Code | Activation Date | Expiration Date |
|---|---|---|---|---|
| CME DM – Telco – Four in One Package – Cross-sell | Email Offer to Upsell to Premium Wireless | 176914-5267979 | | |
| CME DM – Wireless – Premium Package – Upsell | | 176914-5273838 | 6/1/2005 | 12/31/2006 |
| CME Direct Mail – Premium Wireless Package – Upsell | | 176914-5267901 | 4/1/2005 | 12/31/2006 |
| CME Email – Premium Wireless Package – Upsell | Concert Series designed to reward elite... | 176914-5303374 | 5/1/2005 | 6/1/2006 |
| CME Email – Residential Water Heater – Upsell | Email only campaign | 176914-4299015 | 11/24/2004 | 12/1/2005 |

Tabs: Treatment Details | Edit Email | Delivery Profile | Attachments | Advanced

[Menu] [New] [Delete] [Query]

*Treatment Name: CME Email – Premium  
*Treatment Code: 176914-5267979  
*Channel: Email  
Type: Ip-Sell  
*Parent Offer: 176914-5267901  
Products: Premium Wireless  
Email Marketing Server: Email Marketing S.

Activation Date: 1/1/2005  
Expiration Date: 12/31/2006  
Description: Email Offer to Upsell to Premium Wireless  
Subject Text:  
Version:  
Personalization Format: Default Merge Fi...  
Subscription List:

Approval Status:  
Approval History:

ENABLING A BUSINESS ENTITY TO VALIDATE SUPPORT FOR SPECIFIC ACTIVITIES IN A CRM SYSTEM BEFORE MIGRATION FROM EARLIER VERSIONS

RELATED APPLICATIONS

The present application is related to and claims priority from co-pending India provisional patent application entitled, "Intelligent Framework—CRM Migration Validation", application serial number: 1431/CHE/2008, filed on Jun. 12, 2008, naming as inventor Sanjay Sharma, and is incorporated in its entirety herewith.

BACKGROUND OF THE INVENTION

1. Technical Field

The present disclosure relates to customer relationship management (CRM) systems and more specifically to enabling a business entity to validate support for specific activities in a CRM system before migration from earlier versions.

2. Related Art

Customer Relationship Management (CRM) systems are commonly used to assist a business entity in managing the relationships/contacts with its current and prospective customers, in particular, while providing various functions such as marketing campaigns, enquiries, sales, technical support, complaints handling, billing, etc. Siebel CRM product available from Oracle Corporation (the intended assignee of the subject patent application) is an example of such a system.

Activities form the basis for relationship management in CRM systems. Activities represent interactions between the organization and the corresponding customers such as a change of address, payment of a bill, sending an offer, etc., and also administrative actions which facilitate such interactions such as creating an offer, raising an invoice, etc. which are common in customer relationship management. Each activity is manifested as corresponding data in the CRM system typically associated with performance of a sequence of actions (by a customer, a representative or the CRM system). For example, a change of address activity may involve receiving a request from a customer indicating the new address, modifying the data in the CRM system to reflect the new address, and sending a confirmation to the customer as a response to the request.

In general, a CRM system maintains information about the customers, the details of the activities performed (administrative or with each customer), the policies of the business entity, etc., such that representatives of the business entity can access and use such information while managing relationship with customers. In a typical scenario, a CRM system is provided as a "standard" earlier version by a vendor of the CRM system, which is then customized (by changing the code/data modules), according to the requirements of the business entity. The customizations are generally performed to support activities specific to the business entity.

Migration generally refers to the process of transferring data/information between different formats, data types, and/or computer systems and is often necessitated when a CRM system is upgraded from an earlier version (e.g., 7.0) to a later version (e.g. 8.0). Migration may entail modifying a "standard" later version of the CRM system provided by the vendor to incorporate the specific customizations performed for the business entity in the earlier version. Migration thus ensures that the desired activities are supported with the later version of the CRM system as well.

An often important consideration associated with migration is validation. Validation entails verifying that the customizations performed in the earlier version of the CRM system are or would be properly/satisfactorily migrated to the later version. In particular, it may be desirable to validate that specific activities (in particular, those that are critical or unique to the business entity) that can be performed in the earlier version, are supported in the later version of the CRM system.

In one prior approach, validation is performed by testing the CRM system after migration of the customizations to the later version. Migrations typically require considerable time (e.g., 2 to 3 years) and accordingly post-migration validation is delayed until such time. Therefore, if a decision is later made to revert back to an earlier version, substantial time/resources may be wasted.

Aspects of the present invention address one or more of the problems noted above.

BRIEF DESCRIPTION OF THE DRAWINGS

Example embodiments of the present invention are described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention enables users (belonging to a business entity) to validate support for specific activities in a customer relationship management (CRM) system before migration from an earlier version to a later version. In one embodiment, the differences between the earlier version and the later version of the CRM system are first identified. An application based on the identified differences is then implemented, with the application designed to demonstrate how activities according to the earlier version would be operative in the later version. The application is provided with an input data representing a first activity (according to the earlier version) and executed to demonstrate how the first activity would be operative in the later version of the CRM system.

A user may then inspect an output (e.g., user interfaces related to the first activity) of execution of the application to validate support for the first activity in the later version of the CRM system. By performing such validation before migration, the delays caused by post-migration validation as well as the wastage of time/resources to revert to earlier version are avoided.

In one embodiment, each of the identified differences is one of a schema (or object repository) difference between the databases used in the earlier and later versions, a user interface difference between those provided by the different versions and a difference in program logic between the different versions of the CRM system. For a schema difference, a difference database with a difference schema is first created, with the difference schema containing database elements (such as tables, rows, columns, etc.) that are present only in the later version database (and which are not present in the earlier version database). The application is designed to store the input data in the difference database according to the difference schema.

For a user interface difference, the application is designed to provide the same interface as provided by the later version in response to the input data. In other words, the application displays the manner in which the input data corresponding to the first activity appears in the later version of the CRM system. For a difference in program logic, the application is designed to perform the same program logic as the later version in processing the input data representing the first activity.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
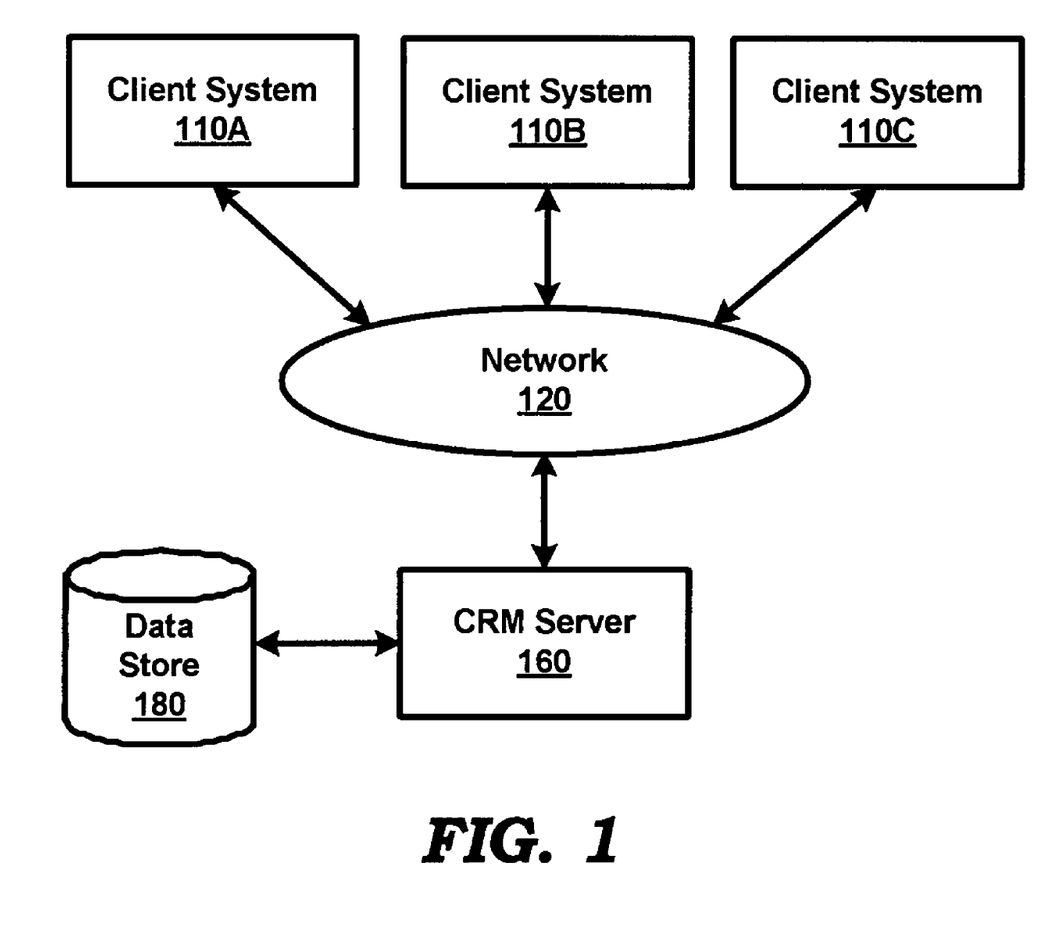
FIG. 1 is a block diagram illustrating an example environment (computing system) in which several aspects of the present invention can be implemented.

FIG. 1 is a block diagram illustrating an example environment (computing system) in which several aspects of the present invention can be implemented. The example computing system represents a CRM system (in an earlier version, for example, 7.0) used by a business entity to manage relationship with its customers. The earlier version of the CRM system is shown containing client systems 110A-110C, network 120, CRM server 160, and data store 180.

Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between client systems 110A-110C, and CRM server 160. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Data store 180 represents a non-volatile storage facilitating storage and retrieval of a collection of data by applications executing in CRM server 160. Data store 180 may maintain data related to activities (for example, billing information, marketing deals, communications with customers, etc.,) in real time. Data store 180 may also store historical (activity) data such as the past interactions between customers and the business entity.

In one embodiment, data store 180 is implemented using relational database technologies wherein data is organized in form of databases containing tables (which in turn contains rows and columns) as is well known and storage and retrieval of data is provided using structured queries such as SQL (Structured Query Language). SQL refers to a special-purpose, generally non-procedural language (that is indicates what to retrieve based on conditions, in contrast to how to retrieve) that supports the definition, manipulation, and control of data in systems implementing relational database technologies.

Each of client systems 110A-110C represents a system such as a personal computer, workstation, mobile station, etc., used by end users to generate requests to applications executing in CRM server 160. The requests may be generated using appropriate user interfaces provided on a display unit (not shown) associated with the client system. In general, a client system requests an application for performing desired actions (forming part of an activity) and receives corresponding responses containing the results of performance of the requested actions from the application.

For example, marketing users/representatives of the business entity may use one of client systems 110A-110C to send requests to a marketing application for retrieving/updating information such as the marketing offers of interest to different customers, the specific offers accepted by each customer, etc. Similarly, client systems 110A-110C may be used by users/administrators to send requests to a billing application to retrieve/update the billing information related to each of the customers. Further, client systems 110A-110C may be used by contact center agents/representatives to send requests to different applications to access various customer related information to handle incoming product support or information inquiry calls from the customers or to enable outgoing contacts for telemarketing, sending reminders, debt collection, etc.

CRM server 160 represents a server system, such as a web and/or application server, executing various applications for handling different CRM functions such as marketing, billing, customer contact, etc. Each application (such as a marketing/ billing/contact application) is designed to provide corresponding services (such as performing activities) to users using client systems 110A-110C. For example, a contact application may be designed to accept requests for performing specific actions (forming part of a activity) from contact center agents, to perform the requested actions and to send corresponding responses containing the results of performance of the requested actions to the requesting client system. The performance of the requested actions/activities by the different applications may cause addition, modification and/or deletion of the data (such as the customer marketing/ billing/call information) stored in databases in data store 180.

Thus, CRM system of FIG. 1 (including the various databases, applications, etc. described above) facilitates users/ representatives of the business entity to perform various activities such as interactions with the current/prospective customers of the business entity, performing administrative actions, etc. It may be appreciated that the deployed CRM system of FIG. 1 may be a highly customized (based on the activities that need to be supported) form of the "standard" earlier version as provided by a vendor of the CRM system.

Accordingly, when the CRM system of FIG. 1 is sought to be upgraded to a later version (for example, 8.0), it may be necessary to migrate the data/code modules (including customizations) from the earlier version to the later version. As noted above, migration may entail modifying a "standard" later version of the CRM system provided by the vendor to incorporate the specific customizations performed for the business entity and as such may require considerable time (e.g. 2 to 3 years). Accordingly, a business entity may wish to decide on the upgrade of the CRM system based on whether specific (critical or unique) activities are supported by the CRM system in the later version.

Several aspects of the present invention enables a business entity to validate support for specific activities in the CRM system of FIG. 1 before migration from the earlier version as described below with examples.

3. Enabling a Business Entity to Validate Support for Specific Activities

Figure 2:
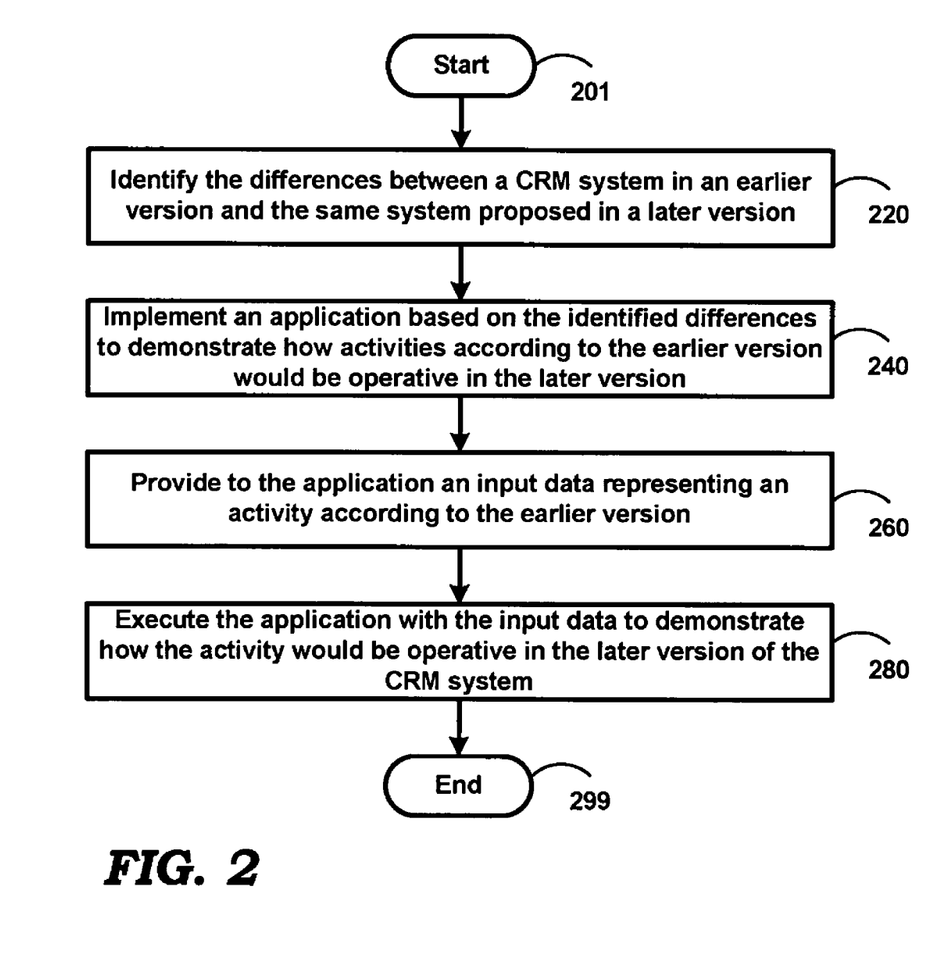
FIG. 2 is a flowchart illustrating the manner in which a business entity is enabled to validate support for specific activities in a CRM system before migration from earlier versions according to an aspect of the present invention.

FIG. 2 is a flowchart illustrating the manner in which a business entity is enabled to validate support for specific activities in a CRM system before migration from earlier versions according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 220.

In step 220, the differences between a CRM system (for example, of FIG. 1) in an earlier version (7.0) and the same system in a later version (8.0) is identified. Differences may include the changes to the hardware and/or software (data/code) modules contained in the CRM system between the "standard" (earlier) and later versions of the CRM system and/or the customized earlier and later versions. In particular, the differences that affect the specific activities of the CRM system are identified.

In one embodiment described below, the differences includes the changes between the schemas (of the earlier and later versions) of the databases maintained in data store 180, the changes in the object definitions also maintained in data store 180, the modifications to the code files/modules executing in CRM server 160 and the alterations in the user interfaces shown to users using client systems 110A-110C.

The difference between the versions may be identified using appropriate tools (provided by the vendor of CRM system) in a known way. For example, database comparison tools may be used to identify the differences in schemas of databases while file comparison tools may be used to identify the difference in the code files (or corresponding model files, for example, UML file) and also to identify the differences in the user interfaces (that are specified as corresponding files, for example, HTML files). The identified differences may be stored as an electronic file in CRM server 160.

However, in some scenarios, it may be necessary that the differences between the versions be manually identified by a user/administrator by inspecting the data/code modules and/or by viewing (on a display unit) the user interfaces of the earlier version and the later version of the CRM system. The user/administrator may then create a physical document specifying the differences identified between the different versions of the CRM system. The physical document and the electronic file may be mutually updated with the differences specified in the other.

In step 240, an (demo) application is implemented based on the identified difference to demonstrate how activities according to the earlier version would be operative in the later version. The demo application may be implemented based on the differences specified by the physical document and/or the electronic file. It may be appreciated that the demo applicant needs to only address the activities that are operative differently (either in terms of internal implementation or external user interfaces) in the later version.

Accordingly, the demo application needs to implemented taking into consideration the differences (identified in step 220), as pertinent to each activity. For example, if there are differences in the schema (or object repository), an additional database (described as difference database below) may be employed to store the activity related data to account for the differences in the later version. If there are differences in user interface, the demo application needs to provide the corresponding user interface (of the later version). Similarly, if a different logic is implemented in the later version to process the activity related data the demo application may be implemented to reflect the differences.

The implementation of the demo application is typically manual (requiring normally 3-6 months), though in some embodiments, a combination of code generation (based on the differences specified by the electronic file) and manual coding may be employed to implement the application. In another embodiment, the differences between the versions are captured in a difference file according to a pre-defined format (e.g., XML tags), which is then used by a code generator to automatically generate (without manual coding) the demo application.

In step 260, an input data representing an activity according to the earlier version is provided to the demo application. The activity may be one of the specific (e.g. critical or unique) activities for which support is sought to be validated by the business entity. The input data may be provided by a user/tester using one of client systems 110A-110C by using appropriate user interfaces. In one embodiment described below, the input data is stored in data store 180 (in an earlier version) and then provided to the demo application.

In step 280, the demo application is executed with the input data to demonstrate how the activity would be operative in the later version of the CRM system. The demonstration may provide as output (for example, in the form of files) the manner in which the input data representing the activity would be processed in the later version of the CRM system. A user/tester may then manually inspect/check the provided files to determine whether the activity (as specified by the input data) is supported by the later version of the CRM system. Alternatively, user interfaces (provided for the performance of the activity in the later version) may be displayed on a display unit associated with one of client systems 110A-110C thereby enabling the user/tester to visually inspect and validate that the activity is supported. The flowchart ends is step 299.

Thus, by performing steps 260 and 280 a desired number of times, a business entity is enabled to validate support for specific activities in the CRM system (of FIG. 1) before migration from the earlier version. In a scenario that all the activities are demonstrated to be supported by the later version of the CRM system, the business entity may decide to upgrade the CRM system from the earlier to the later version.

Alternatively, the business entity may decide not to upgrade the CRM system from the earlier version to the later version. It may be appreciated that the business entity may take such a 'not to upgrade' decision much earlier (after the time taken to implement the demo application, which is normally 3-6 months) than when the validation is performed post migration (which may take 2-3 years). The manner in which the steps of FIG. 2 are implemented in one embodiment is described below with examples.

4. Example Implementation

Figure 3:
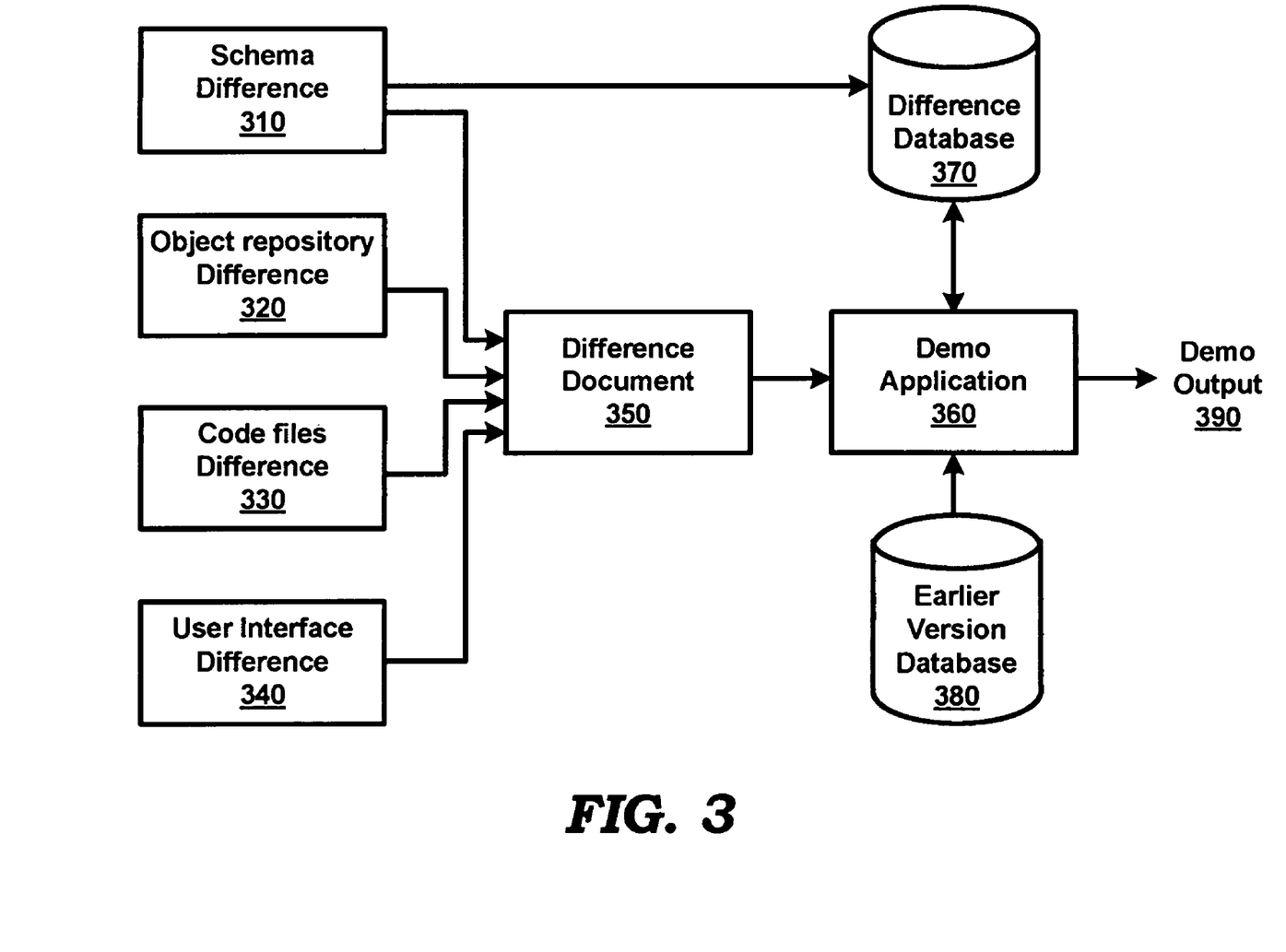
FIG. 3 is a block diagram illustrating the manner in which a business entity is enabled to validate support for specific activities in a CRM system before migration from an earlier version to a later version in one embodiment.

FIG. 3 is a block diagram illustrating the manner in which a business entity is enabled to validate support for specific activities in a CRM system (of FIG. 1) before migration from an earlier version (7.0) to a later version (8.0) in one embodiment. The description is continued assuming that the later version of the CRM system is implemented in a computing system similar to the earlier version of the CRM system as shown in FIG. 1.

The block diagram of FIG. 3 is shown containing schema difference 310, object repository difference 320, code files difference 330, user interface difference 340, difference documents 350, demo application 360, difference database 370, earlier version database 380 and demo output 390. Each block of FIG. 3 is described below in further detail.

Difference documents 350 represents a set of physical documents or electronic files (or a combination thereof) that specifies the differences between the CRM system of FIG. 1 in the earlier version 7.0 and the same system in the later version 8.0. Difference documents 350 may be generated automatically using appropriate tools or manually by a user/administrator by inspecting the data/code modules and/or by viewing (on a display unit) the user interfaces of the different versions of the CRM system.

Portions of a sample difference document specifying the details of a change of terminology (from the term "Offer" in version 7.0 to the term "Treatment" in version 8.0) are shown in Appendix A. It should be appreciated that only sample portions are included and described below for conciseness, though typical documents would contain more differences, as would be apparent to one skilled in the relevant arts by reading the disclosure provided herein.

Appendix A specifies that the entity/table "Offer" in version 7.0 (representing an offer/proposal that can be provided to customers) is sought to be replaced with the entities/tables "Offer" and "Treatment" in version 8.0, with the new term "Treatment" representing the manner/channel (e.g., by direct mail, by direct sales, by email, by phone, etc.) using which the same offer is provided to the customers. The description is continued assuming that the specific activity of creating an offer (that can be later sent to customers using appropriate channels) in the CRM system is sought to be validated for support in the later version before migration.

Section 1.1 titled "Current Issues" describes the reasons for the change of terminology. In particular, section 1.1 indicates that in version 7.0 each offer was specifically tied to a channel and accordingly required redundant data entry (e.g., to create a set of related offers) when the same proposal was needed to be delivered using more than one channel. Section 1.1 also describes other issues with the "Offer" entity in version 7.0.

Section 1.2 "Proposed Changes in version 8.0" describes the proposed changes in version 8.0 (the later version) to overcome the problems described in section 1.1, while section 1.3 titled "Test Scenarios" specifies various scenarios that need to be supported by the proposed terminology change. The different types/number of differences specified in section 1.2 can be broadly grouped together as schema difference 310, object repository difference 320, code files difference 330 and user interface difference 340 as described in detail below.

Schema difference 310 represents the changes between the schemas (of the earlier and later versions) of the databases maintained in data store 180. Schema difference 310 may be automatically generated by using database comparison tools. In general, schema difference 310 specifies the database elements (such as tables, rows, columns, etc.) contained in databases used in the later version which not present in databases used in the earlier version. For example, schema difference 310 may specify the new names of the database elements that have been changed/renamed and/or added. Further, the absence of the database element in schema difference 310 may indicate that there is no change to the database elements in the two different versions. Schema difference 310 may also specify the changes to the relationships among the old/new database elements, for example, that a new relationship has been added between two tables.

Schema difference 310 shown in section 1.2.1 of Appendix A specifies that a new entity/table named "Offer" needs to be created with the specified attributes as columns. Section 1.2.1 further specifies that the "Offer" table needs to be defined as having relationships with other entities such as "Treatment" (as 1 Offer having many child Treatments), "Loyalty Promotion", etc. The "Notes" subsection further specifies (item 1) that the existing "Offer" table in the earlier version 7.0 has to be converted to "Treatment" table/entity in the later version 8.0. Such a design facilitates different "Treatment" objects/rows (corresponding to different channels) to be associated with the same "Offer" object/row, thus simplifying specification of the same proposal that was needed to be delivered using more than one channel.

It may be observed that item 3 of "Notes" specifies that the values of the attributes/columns "activation date" and "expiration date" of the "Treatment" objects (that are newly created) are inherited from the similarly named attributes/columns of the corresponding parent "Offer" object. The condition ensures that an offer and its related child treatments are activated and also expire on the same date.

It may be appreciated that such a condition may be used as a basis for validating support for the specific activity of creating an offer in the CRM system. Thus, when a "Offer" in the earlier version is created, support for such an activity may be validated if a corresponding "Treatment" object is generated along with a parent "Offer" object (both in the later version) which has the same values for the activation and expiration dates as the values specified in the "Offer" object created in the earlier version.

Object repository difference 320 represents the changes in the object definitions (of the earlier and later versions) maintained in data store 180. As is well known, an object means a data structure containing data fields and procedures (methods) that can manipulate those fields, while an object repository means a data store (180) used to store the objects and their definitions ("classes"). Object repository difference 310 may be automatically generated by using database comparison tools or by using specific tools (for example, a repository merge tool) provided by the vendor of the CRM system.

In one embodiment, user interfaces are generated based on the object definitions and accordingly, some of the changes to the user interfaces need to be implemented by modifying the corresponding object definitions. Accordingly, object repository difference 320 shown in section 1.2.4 of Appendix A specifies the changes that need to be made to the object definitions in object repository (maintained in data store 180) to support new user interfaces. In particular, section 1.2.4 specifies new Allocation user interfaces using which users can specify the desired Treatment (channel) for each Offer to be used for (communicating the proposal/offer to) different segments (groups of customers). Such an action may be performed after the creation of the offers/treatments and accordingly is not used to validate support for the specific activity of creating an offer in the CRM system.

Code files difference 330 represents the modifications to the code/program files (of the earlier and later versions) executing in CRM server 160. Code files difference 330 captures the modifications that are made to the program logic of the applications executing in CRM server 160. Code files difference 330 may be automatically generated by using file comparison tools. However, some of the changes in the program logic may need to be manually specified by a developer of the CRM system.

Code files difference 330 is shown in sections 1.2.3, 1.2.4 (in particular, the subsections titled "Eliminate Stage Object" and "Modify Menus") and 1.2.5 of Appendix A. Each of the sections specifies the changes that have to be made to the program logic/flow (in the later version) to reflect the changes in the "Offer" entity design and the corresponding user interfaces. For example, subsection "Eliminate Stage Object" in section 1.2.4 indicates that the stage concept was originally created due to the inability (in the earlier versions) to associate segments directly to offers. By providing the Allocation user interfaces as described above, the stage object and the corresponding program logic is rendered redundant and needs to be eliminated in the later version. It is noted that such an action does not affect the specific activity of creating an offer in the CRM system that is sought to be validated.

It may be appreciated that besides the differences in the code/program files constituting the CRM system, code files difference 330 may also capture the changes in the setup files between the different versions of the CRM system. For example, the changes to the device driver files that enable applications to interface with the changed hardware modules in the later version of the CRM system may be captured as part of code files difference 330. Accordingly, changes in the hardware modules between the different versions of the CRM system may be captured and effected in the demo application as described below.

User interface difference 340 represents the changes/alterations in the user interfaces (of the earlier and later versions) shown to users using client systems 110A-110C. User interface difference 340 is typically manually generated by a user/viewer after viewing (on a display unit) the user interfaces of the different versions of the CRM system. However, in a scenario that the user interfaces are specified as corresponding files (e.g., HTML files), the differences can be identified using file comparison tools well known in the relevant arts.

User interface difference 340 is shown in sections 1.2.2, 1.2.3 and 1.2.4 of Appendix A. Each of the sections specifies the changes that have to be made to the user interfaces (in the later version) to reflect the changes in the "Offer" entity design. In particular, item 5a in section 1.2.2 specifies that the activation date and the expiration date to be shown in the "Treatments" user interface should be inherited from the parent "Offer" (as also indicated by the condition in item 3 under "Notes" subsection in section 1.2.1 for the database schema).

Accordingly, support for the specific activity of creating an offer in the CRM system may be validated if a corresponding "Treatment" object is displayed in the "Treatments" user interface and a parent "Offer" object is displayed in the "Offers" user interface (both in the later version) having the same values for the activation and expiration dates as the values specified in the "Offer" object created in the earlier version.

Thus, difference documents 350 capture the differences identified between the CRM system of FIG. 1 in the earlier version 7.0 and the same system in the later version 8.0. The identified differences are used as a basis for implementing difference database 370 and demo application 360 as described below.

Difference database 370 represents a database generated based on schema difference 310 and correspondingly captures the differences in the schemas of the databases (in data store 180) used in the difference versions of the CRM systems. In general, the schema of difference database 370 contains database elements that are present only in the later version database (and not present in the earlier version database). Thus, difference database 370 may have "Offers" table (new table not present in the earlier version) and "Treatments" table (renamed table corresponding to the old table "Offers" in the earlier version) as per the specification of the difference document portions shown in Appendix A.

Difference database 370 may also store a metadata indicating the mappings between the database elements in the different versions. For example, the metadata may indicate that the "Offers" database element in the earlier version is mapped to (or renamed to) the "Treatments" database element in difference database 370 (as well as the later version). The metadata may further indicate the mappings between the attributes/columns of the old "Offers" table and the attributes/columns of the renamed "Treatments" table.

Demo application 360 represents an application implemented based on the identified differences specified in difference documents 350 and designed to demonstrate how activities according to the earlier version 7.0 are operative in the later version 8.0 of the CRM system. As described above, demo application 360 (or portions thereof) may be implemented either manually or automatically (when difference documents 350 are provided according to a pre-defined format). Demo application 360 may be designed to work with the data/metadata stored in difference database 370.

Demo application 360 may be designed to demonstrate the operation of the differences specified in the difference document of Appendix A. For example, for the specific activity of creating an offer according to the earlier version 7.0, demo application 360 may be designed to store the activity related data ("Offer" object according to version 7.0) into difference database 370 (e.g., according to the mappings from the old "Offer" table to the new "Treatment" table and then add a new row to the new "Offer" table), create corresponding new repository objects (e.g., for providing the corresponding new Allocation interfaces) and also provide the modified "Offers" and "Treatments" user interfaces (as specified in sections 1.2.2, 1.2.3 and 1.2.4) for viewing the details of the created offer.

Demo application 360 is provided with an input data (according to the earlier version) representing a first activity (sought to be validated) and executed to demonstrate how the first activity would be operative in the later version of the CRM system. The input data may be received from a user/tester using one of client systems 110A-110C (using appropriate user interfaces). For example, a user/tester may be enabled to perform the specific activity of creating an offer in the earlier version of the CRM system. On receiving the input data (Offer object), demo application 360 may process the input data as described above and provide the "Offers" and "Treatments" user interfaces to the user/tester.

Alternatively, earlier version database 380 representing a database used in the earlier version 7.0 of the CRM system may be used to provide input data representing activities to demo application 360. A user/tester may first store input data corresponding to the different activities (whose support needs to be validated) in earlier version database 380 and then send an indication that all the stored activities are sought to be validated. On receiving the indication, demo application 360 retrieves the input data for the different activities and then demonstrates how the stored activities would be operative in the later version of the CRM system.

In one embodiment, a demonstration of the execution paths in the form of log files is provided to the user/tester, thereby enabling the user/tester to determine whether the specific transaction is supported by the later version of the CRM system by inspecting the log files. In another embodiment, the user interfaces (e.g., "Offers" and "Treatments" interface) of the later version generated corresponding to the input data (e.g. Offers object representing creation of a offer) is displayed to the user/tester in the form of demo output 390.

Demo output 390 represents the user interfaces of the later version of the CRM system that are generated by demo application 360 in response to an input data (representing a specific activity). Demo output 390 may be displayed on a display unit associated with the client system from which a user/tester has specified the input data. The user/tester may view/inspect the user interfaces of demo output 390 and visually validate that the activity is supported as described in detail below.

Figure 4A:
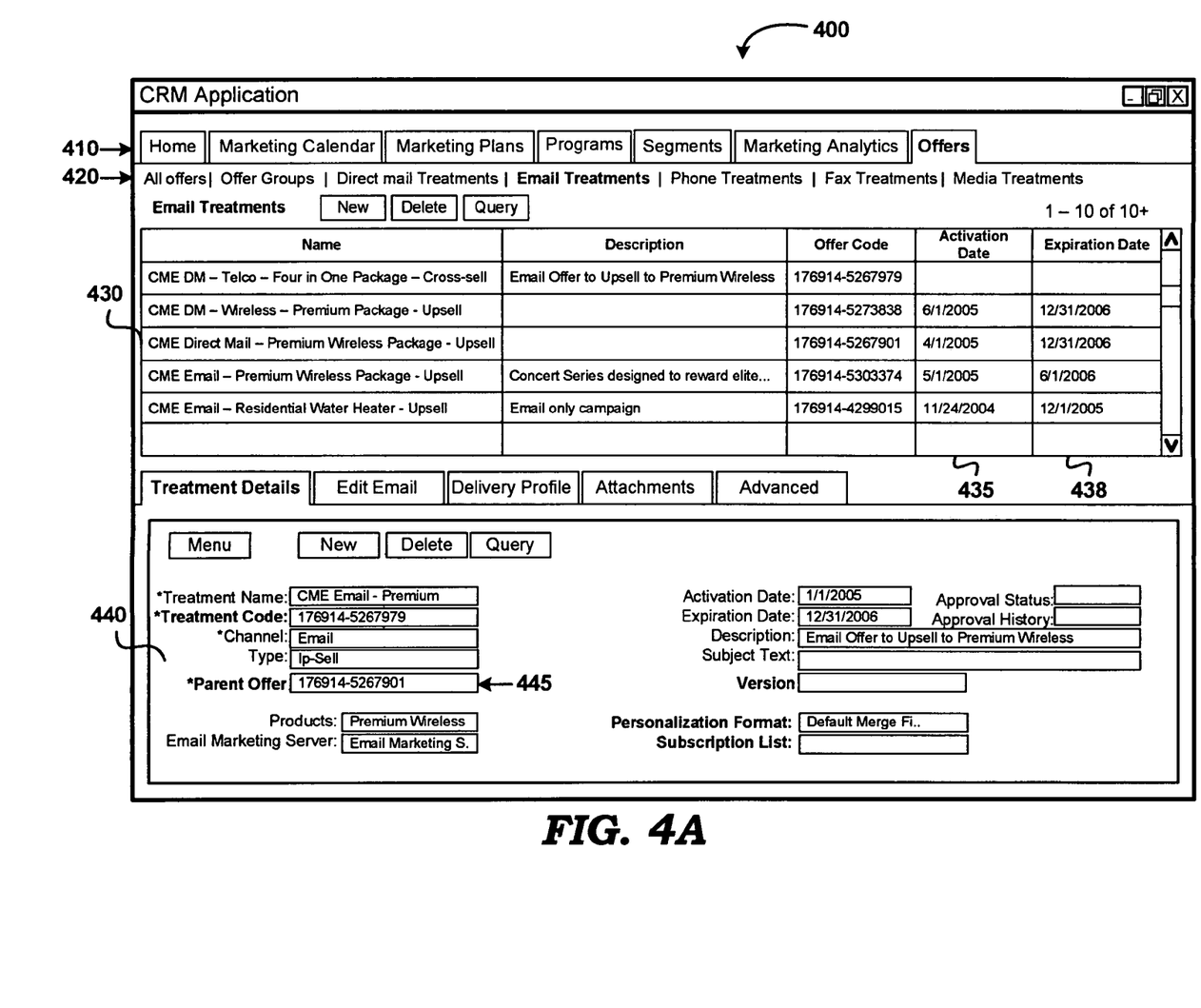
FIGS. 4A and 4B depict sample user interfaces that demonstrate how an activity in an earlier version is operative in a later version of the CRM system in one embodiment.
Figure 4B:
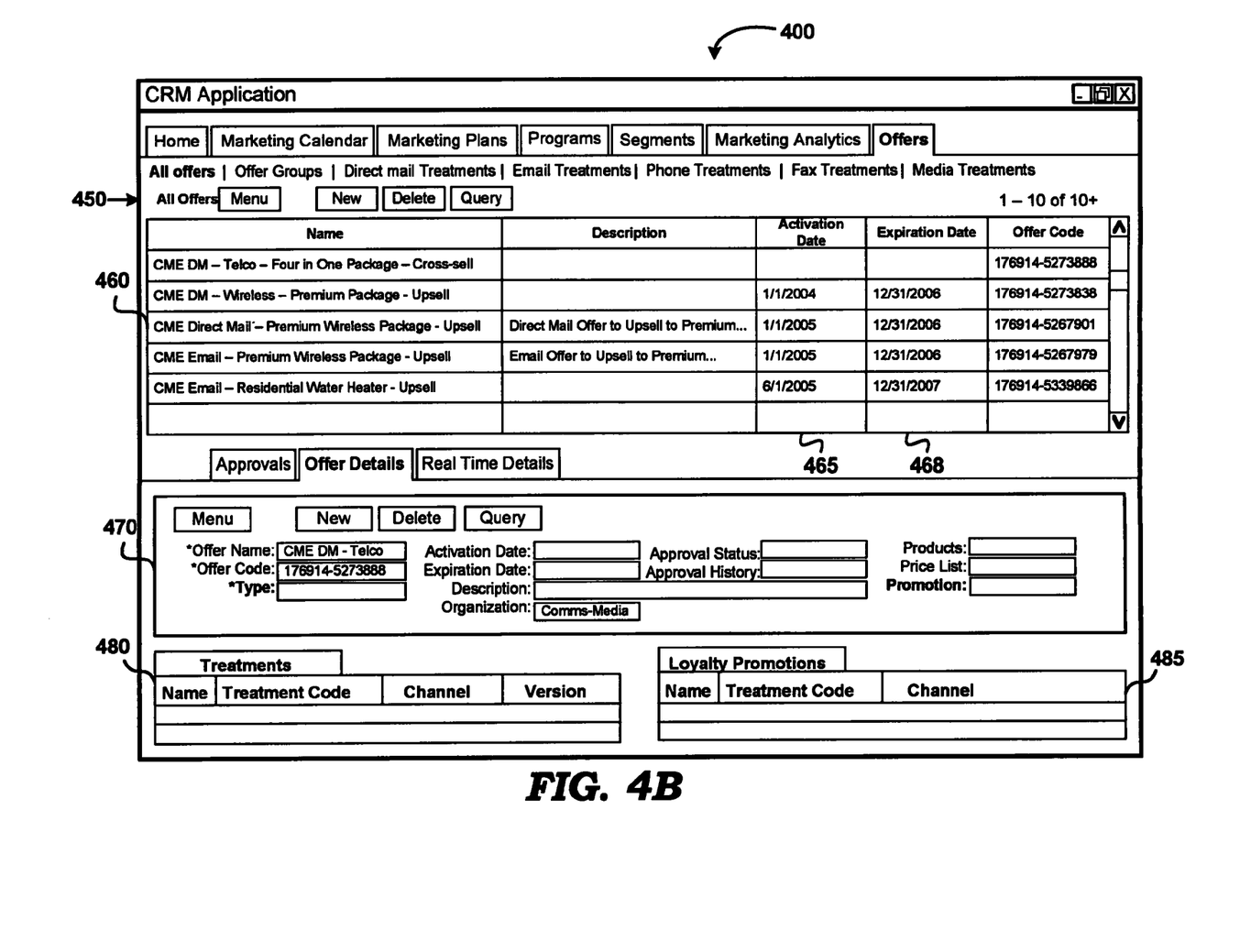

FIGS. 4A and 4B depict sample user interfaces that demonstrate how an activity (creating an offer) in an earlier version is operative in a later version of the CRM system in one embodiment. The sample user interfaces, corresponding to the later version, may be provided as part of demo output 390 by demo application 360. The description is continued assuming that the old "Offer" object provided as input data is converted to a "Treatment" object of type "Email" according to the later version of the CRM system.

Display area 400 (in FIGS. 4A and 4B) depicts a portion of a user interface displayed on a display unit (not shown) associated with one of client systems 110A-110C used by a user/tester. Display area 400 may be displayed by demo application 360 executing in CRM server 160 in response to receiving the input data (from the user/tester) corresponding to the specific activity of creating an offer in the CRM system.

Tabs 410 enable a user to select the specific entity (such as "Programs", "Segments", "Offers", etc.) whose information to be displayed, while menu 420 enables the user to select the specific entity related information to be displayed in display area 400. The selected tab "Offers" and the selected (shown in bold) option "Email Treatments" indicates that the information related to the email treatments is being displayed in display area 400.

Table 430 depicts the details of the email treatments specified in the system, with each row depicting the details of a corresponding email treatment. In particular, columns 435 and 438 respectively specify the activation data and the expiration date of each email treatment. Display area 440 depicts more/all the details of the email treatment corresponding to the selected row in table 430. Thus, a user may select different rows in table 430 and view more/all the details of the corresponding selected email treatments in display are 440. It may be observed that display area 440 includes text field 445 (labeled "Parent Offer") which indicates the code of the parent "Offer" for the selected email treatment.

A user may select the row in table 430 corresponding to the old Offer object (input data) provided to demo application 360 and then view/inspect the details of the specified offer/new treatment object. In particular, the user may verify that the values of the activation date and expiration date attributes displayed in display area 400 are the same as the corresponding values specified in the input data. The user may then select "All Offers" option in menu 420 to view the details of the offers.

Referring to FIG. 4B, display area 400 displays information related to the offers (as indicated by text 450). Table 460 depicts the details of the offers specified in the system, in particular, columns 465 and 468 respectively specify the activation data and the expiration date for each offer. Display area 470 depicts more/all the details of the offer corresponding to the selected row in table 460. Thus, a user may select different rows in table 460 and view more/all the details of the corresponding selected offers in display are 470.

Display area 480 depicts the details of the treatments objects that are related to the selected offer, while display area 485 depicts the details of the loyalty promotions objects that are related to the selected offer in table 430. It may be appreciated that both display areas 480 and 485 are available only in the later version as they are provided based on the differences specified in section 1.2.2, item 2 in the difference document portions shown in Appendix A.

Thus, a user may select the specific offer (based on the code indicated in text field 445) indicated to be parent of the specified "Treatment" object. The user may then verify that the values of the activation date and expiration date for the parent "Offer" object (in the later version) are the same as the values specified in the input data (and also are the same values as displayed for the specified "Treatment" object in the interface of FIG. 4A).

In the scenario that the values of the activation and expiration date are found to be the same for both the new "Treatment" object and the corresponding new parent "Offer" object, the user may validate that the specific activity of creating an offer is supported in the later version of the CRM system. Alternatively, a mismatch in values between the new objects and the input data may indicate a failure of demo application 360 to process the input data, which in turn may indicate that the difference document is not complete and accordingly the later version of the CRM system would not support the activity or that the proposed data migration is defective and will cause failure of application behavior in the later version of the CRM system.

Thus, demo application 360 may be implemented to display the user interfaces of FIGS. 4A and 4B, upon receiving appropriate input data according to the earlier version. The user thus may view the resulting screens in pre-migration validation. Similarly, demo application 360 may be designed to operate according to the program logic of the later version if a difference in program logic (between the versions) is indicated by difference documents 350.

Thus, a user/tester (representing the business entity) may provide different input data corresponding to the different desired activities (either using an appropriate user interface and stored in earlier version database 380) and then view and inspect the corresponding demo output 390 to validate that the desired activities are supported by the later version of the CRM system.

It should be appreciated that the features described above can be implemented in various embodiments as a desired combination of one or more of hardware, executable modules, and firmware. The description is continued with respect to an embodiment in which several features are operative when executable modules are executed.

5. Digital Processing System

Figure 5:
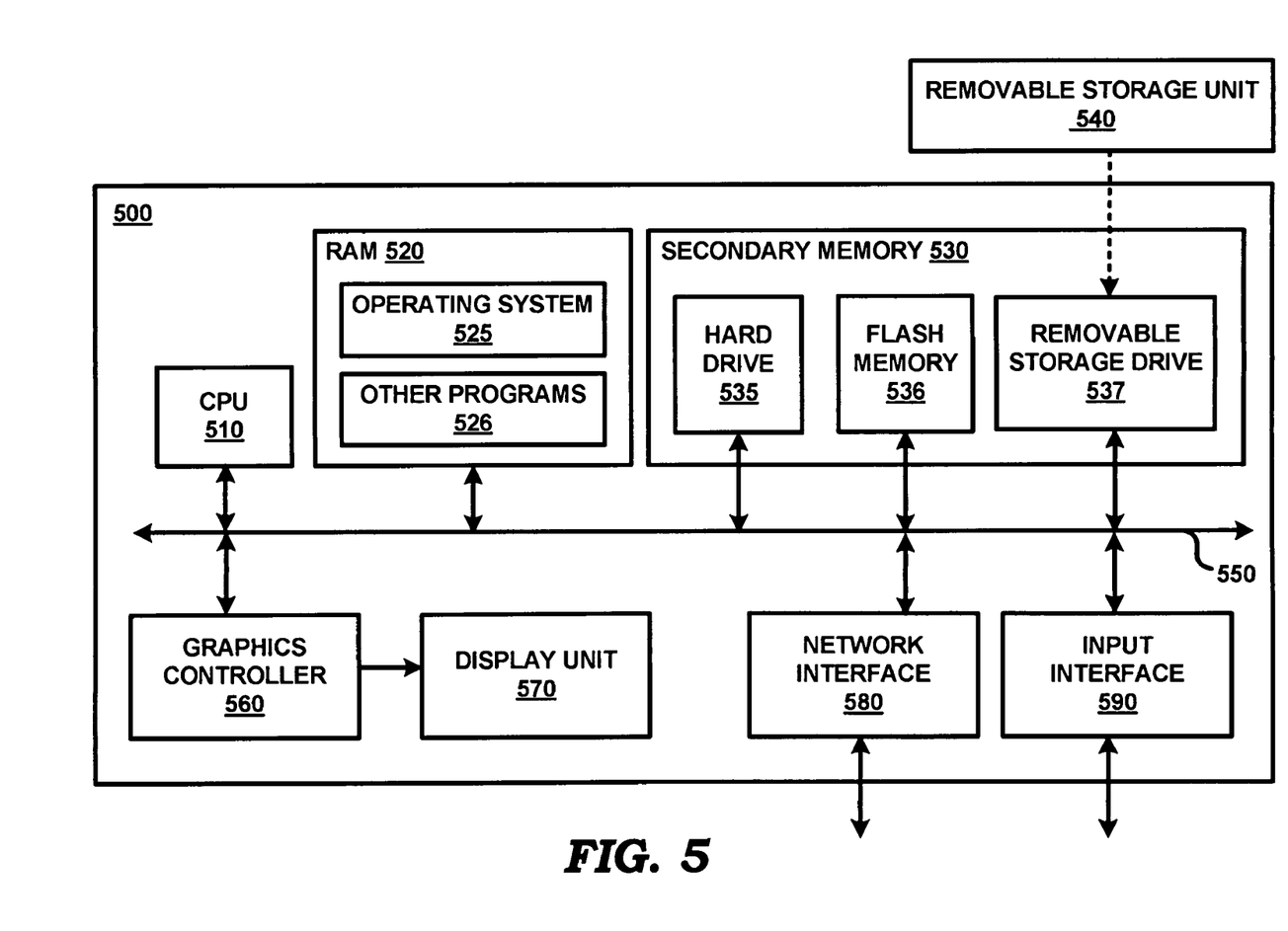
FIG. 5 is a block diagram illustrating the details of an example system in which several aspects of the present invention are operative upon execution of executable modules.

FIG. 5 is a block diagram illustrating the details of digital processing system 500 in which various aspects of the present invention are operative by execution of appropriate software instructions. Digital processing system 500 may contain one or more processors such as a central processing unit (CPU) 510, random access memory (RAM) 520, secondary memory 530, graphics controller 560, display unit 570, network interface 580, and input interface 590.

All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting operating system 525 and/or other code/programs 526 (such as client applications, Web browser, CRM application instances processing user requests, demo application 360, management applications, RDBMS, etc.). In addition to operating system 525, RAM 520 may contain other software programs such as device drivers, virtual machines, etc., which provide a (common) run time environment for execution of other code/programs.

Graphics controller 560 generates display signals (e.g., in RGB format) to display unit 570 based on data/instructions received from CPU 510. Display unit 570 contains a display screen to display the images defined by the display signals (such as the user interface depicted in FIG. 4). Input interface 590 may correspond to a keyboard and a pointing device (e.g., touch-pad, mouse) and may be used to provide inputs. Network interface 580 provides connectivity to a network (e.g., using Internet Protocol), and may be used to communicate with other systems (of FIG. 1) connected to the network.

Secondary memory 530 may contain hard drive 536, flash memory 537, and removable storage drive 538. Secondary memory 530 may store the data (for example, the data shown in Appendix A, the differences captures in difference documents 350) and software instructions (for example, constituting demo application 360), which enable digital processing system 500 to provide several features in accordance with the present invention.

Some or all of the data and instructions may be provided on removable storage unit 539, and the data and instructions may be read and provided by removable storage drive 538 to CPU 510. Floppy drive, magnetic tape drive, CD-ROM drive, DVD Drive, Flash memory, removable memory chip (PCMCIA Card, EPROM) are examples of such removable storage drive 538.

Removable storage unit 539 may be implemented using medium and storage format compatible with removable storage drive 538 such that removable storage drive 538 can read the data and instructions. Thus, removable storage unit 539 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 539 or hard disk installed in hard drive 536. These computer program products are means for providing software to digital processing system 500. CPU 510 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

APPENDIX A 1.0 Terminology Change

This document specifies an example change sought to be implemented in the marketing application of the CRM system where there is a change in the scheme from the CRM 7.0 version to the CRM 8.0 version, whereby the entity called Offers (7.0 version) will be changed to a new entity in the repository and database for CRM 8.0 version as "Treatment".

The following table summarizes the terminology changes proposed in 8.0. The first column denotes the previous terminology and the second column is the new terminology.

| CRM Version 7.0 | CRM Version 8.0 | Comments |
| --- | --- | --- |
| Offer | Treatment | Old offer becomes 'Treatment' |

1.1 Current Issues

The current shortcomings of our Offer design in version 7.0 include:

Offer is specifically tied to a channel. This makes it difficult to analyze the performance of an offer across channels. This also requires redundant data entry when you need to deliver the offer across more than one channel.

Campaign targeting process is not performed at the offer level, meaning that customers have to create a campaign for each offer (very redundant). This results in significantly more clicks and lower user adoption.

Allocation between segments and offer is cumbersome and not explicit. There is no mechanism to directly indicate which segments or cells should receive each offer and treatment. This has to be inferred through the campaign relationship and requires the product to be used in particular ways to be reliable (one offer per campaign). This 'best practice' is not enforced by the UI in anyway.

1.2 Proposed Changes in Version 8.0

The following is a brief description of the proposed changes in version 8.0 that could overcome the above described problems.

1.2.1 Create a New Offer Entity

Offer entity should represent a 'cross-channel' proposition to the customer. Attributes of Offer include:

Name and Description
Offer Code
Type (Upsell, Cross-sell, etc.)
Activation and Expiration Date
Products
Approval Status and Approval History
Organizations (MVG)
Created By
Modified By
Product Promotion (FK)
Offer is related to the following objects:
Treatments (1 offer: many child treatments)
Loyalty Promotion (each offer is linked to one or more loyalty promotions)
Product Promotion (each offer is linked to one Product Promotion).
Organization (many orgs)

Notes

1. Convert existing offer objects into 'Treatment' objects.
2. Replace existing term 'offer' with 'Treatment' in all UI locations and error messages.
3. Some attributes of the treatment are inherited from the parent offer when the treatment is created:
   a. Activation and Expiration Dates
   b. Affected relationships
4. Campaign History—Modify campaign history to include both Offer ID and Treatment ID. Both IDs are optional to provide backward compatibility for customers.
5. Responses—Create relationship between Offer+Response and Treatment+Response (already existing). Modify Response buscomp User Key so that Campaign is no longer a required field for a response record. Offer ID is the only required ID for a response.
6. There should be a primary Treatment for each Offer.

1.2.2 Campaign and Offer UI Changes

Create new screen menu item for 'Offers' to display list of all new cross-channel offers. New views:

1. All Offers list applet—offers list with Form applet at bottom
2. Grandchild applets for Treatments and Loyalty Promotions
3. Offer Approvals view
4. Replace existing term 'offer' with 'Treatment' in all UI captions and error messages.
5. Changes to existing Offer views (now called Treatments)
   a. Add 'Version Number' field (picklist or numeric entry field?)
   b. Activation and Expiration dates should be inherited from parent offer.
6. Modify 'Campaign Offers view' to show new offers instead. Treatments should be displayed as a grandchild applet under Offers applet.
7. Modify Responses screen to associate Response to Offer and Treatment
8. Association to 'Campaign' (now Marketing Activity) is optional
9. Association to Offer is required
10. Association to Treatment is optional
11. Create Offer Explorer screen
12. Create a tree based Offer Explorer view. The hierarchy would be Offer to Treatment. Need mechanism to indicate categories or folders for offers. Should be N layers deep ideally to accommodate hundreds of offers and same flexibility as RTD interface. If we don't have a foldering attribute, then the explorer would only be 2 levels deep (offer to treatment).

1.2.3 Program and Campaign UI Changes—Modify Program Flow to Reflect Changes in Offer Design Create a 'Campaign Allocation' under the Design tab to allocate offers to segments and trees. When the user drills on the campaign icon in the program flow, it would navigate to this view. Similarly, they would be able to use this view for standalone campaigns. The Campaign Allocation view will have 3 applets:

Top applet (Campaign Form)
Middle applet (short list with one or more segment tree records). This allows them to associate more than one tree per campaign.
Bottom applet is Allocation Matrix applet. Displays the offer allocation relationships for the tree record selected in the middle applet.

1.2.4 Repository Changes—New Allocation Matrix Applet (New UI)

Provide a toggle on the applet to view 2 styles of Allocation display (Treatments or Flat) as described below.

Flavor #1 of the Allocation Applet (Treatment View)

1. Modify Allocation matrix applet in the following ways:
2. Vertical columns should be Offers rather than campaigns
3. Provide better word wrapping for offer captions (2 lines minimum). If offer name is longer than 2 lines, then add . . . . To end.
4. Convert check boxes into selection boxes. For each cell in the matrix, there will be a pick icon that opens a pick applet displaying a list of existing treatments for the selected offer column. When a treatment is selected and committed, the treatment code will be displayed in the cell.
5. The treatment picklist popup should display Treatment Name, Treatment Code, and Treatment Channel, so make it easier for the user to determine which treatment is which. Should support query/sort on the list if possible.

Flavor #2 of the Allocation Applet (Flat View)

6. This display style is more appropriate for scenarios with fewer offers or where they want to be able to allocate the same segment to more than one treatment for the same offer.

7. Layout:
8. There should be a column for each combination of Offers+treatment. The column header would display two lines (Line 1: Offer, Line 2: Treatment)
9. Use check boxes to link segment node to column.
10. The user should be able to toggle back and forth between display styles and view the same data. There is a small gap in that the Flat View can display more than one treatment per offer, which can't be shown on the Treatment view. Most of the allocation data should work in both display modes.
11. Modify Allocation applet so that standalone segments that are associated to the campaign are also displayed. The block for the segment should appear in the bottom section below the tree.
12. If there is no segment tree (just standalone segments), automatically compress the tree section to save real estate.

Eliminate Stage Object

The stage concept was originally created as a mechanism so that a segment tree could be allocated across campaigns. This was required because of the inability to associate segments directly to offers. Given the new feature to link segments and offers directly, the stage object is not really necessary any more.

Remove Stage icon from program flow palette. (Icon can continue to appear for upgraded programs, but will not have any affect on functioning).

Campaign should now be directly a child of program (takes out former hierarchy layer for stage).

Segment trees can be directly connected to a single campaign (similar to standalone segments). This relationship establishes the allocation matrix (offers from campaign associated to segment tree).

Program Flow should not allow the same tree (S_CALL_LST instance) to be associated to more than one campaign. This reduces the likelihood that 2 users would be trying to execute prepare cache for the same tree at the same time (stepping on each other's process). Change the allocation applet so that it is a popup on top of the program flow rather than navigating to a new page. This is an important usability enhancement that affects the perception of our product during sales cycles.

Modify Menus

Modify the menus on program flow as follows:
For Segment Tree icon, provide 2 options to 'Allocate' (allow user to either open the allocation view/popup) or 'view' the segment tree definition.
For campaign icon, provide 2 options to 'View Details' (navigate to Offers view) or Allocate (open Allocation popup).

1.2.5 Modification to Campaign Load and Launch Processes

Campaign Load Process

Modify campaign load to populate Campaign ID, Offer ID and Treatment ID columns based on allocation matrix.

By default the load process should populate all the Offer IDs into the same Wave Number.

We should create one row in S_CAMP_CON for each Contact to Offer combination. If a customer qualifies for more than offer, they would have more than one record in the campaign.

If there is more than one email treatment for the same campaign, this should spawn parallel threads to send the recipient list for each qualifying treatment through ESD. For example, we could have a Spanish and English email treatment. All the Spanish speaking customers would qualify for Treatment 1 and would be included in the first thread. English recipients would receive the second thread.

We should extend Campaign Wave History view (where we record the offers used for each wave) to record the treatments that were sent in addition to offers.

Scheduled Execution

Assuming that Stage object is removed, modify Stage Execution workflow process to work at a single campaign level. Rather than executing load and launch for all the campaigns in a stage, it would simply execute load and launch for the campaign.

Change the Activity Type on the Calendar from 'Stage Execution' to 'Campaign Execution'. The user would be able to schedule 'Campaign Execution' activity on either the Program calendar or the Campaign calendar (same result).

1.3 Test Scenarios

Scenario 1a: Multiple direct mail tests
Direct mail to drive customers to targeted web page Campaign Gold

Silver

| Entity model: | Relationships: |
|---|---|
| 1 program | Offer to Treatment 1:M |
| 1 campaign | DM Treatment to Web Treatment M:1 |
| 1 offer - 4 DM treatments | Product to Treatment (inherited from |
| 2 Web treatments | promotion?) |
| 1 product? | |

Scenario 1b: Multiple direct mail tests
Direct mail to drive customers to targeted web page Campaign Gold

| Entity model: | Relationships: |
|---|---|
| 1 program | Offer to Treatment 1:M |
| 1 campaign | DM Treatment to Web Treatment M:1 |
| 1 offer - 4 DM treatments | Product to Treatment (inherited from |
| 1 Web treatment | promotion) |
| 1 product | |

Scenario 2: Enewsletter
Enewletter with multiple promotions (e.g. frequent flyer email statement)

Campaign

```
Gold
    Email newsletter 1
        (Promotion 1) ———▶ Web page 1
        (Promotion 2) ———▶ Web page 2
        (Promotion 3) ———▶ Web page 3

Silver
    Email newsletter 2
        (Promotion 2) ———▶ Web page 2
        (Promotion 3) ———▶ Web page 3
        (Promotion 4) ———▶ Web page 4
```

Entity model:                 Relationships:

1 program                     Offer to Treatment 1:M
1 campaign                    Treatment to Treatment 1:M
2 email treatments - related
to multiple promotions
4 web treatments
4 product promotions

Scenario 3: Custom coupon book
Segment tree cell corresponds to each offer

Stage

```
Gold
    Cell 1 ———▶ DM treatment 1
    Cell 2 ———▶ DM treatment 2
    Cell 3 ———▶ DM treatment 4
    Cell 4 ———▶ DM treatment 4
    Cell 5 ———▶ DM treatment 5
    Cell 6 ———▶ DM treatment 6
```

| | John | Mary |
|---|---|---|
| | x | |
| | | x |
| | x | x |
| | x | |
| | | x |
| | x | |

Entity model:                 Relationships:

1 program                     Offer to treatment 1:1
1 campaign                    Package to Treatment 1:M
1 DM package - 6 treatments
6 promotions

Scenario 4: Email to web
Email to drive customer to corresponding web page

Stage

```
Gold
    Email 1 HTML ⎫
    Email 1 Text ⎭ ——▶ Web page 1

Silver
    Email 2 HTML ⎫
    Email 2 Text ⎭ ——▶ Web page 2
```

Entity model:                 Relationships:

1 program                     Offer to Treatment 1:M
1 campaign                    Email Treatment to Web Treatment M:1
1 offer - 2 or 4 email treatments
2 Web treatments
1 product

What is claimed is:

1. A method of enabling users to validate support for specific activities in a customer relationship management (CRM) system before migration from an earlier version to a later version, wherein said CRM system of said earlier version is operational before said migration based on a first database while providing a first set of user interface to users, said method comprising:

identifying a plurality of differences between said earlier version and said later version of said CRM system, wherein said plurality of differences contain a difference in schema between said first database used in said earlier version and a second database used in said later version, said plurality of differences further containing differences of a second set of user interfaces provided by said later version and those of said first set of user interfaces with respect to a first activity of a plurality of activities supported by said earlier version;

creating a difference database according to a difference schema, said difference schema containing a set of database elements contained in said second database that are not present in said first database;

implementing an application based on said plurality of differences to demonstrate how a set of activities according to said earlier version would be operative in said later version, said application being operable to:

receiving from a user, an input data designed to make operative said first activity supported in said earlier version, wherein said input data is received according to said second set of user interfaces of said later version;

processing said input data based on data stored in said first database and said difference database; and providing to said user, an output of said processing according to said second set of user interfaces, wherein said user can inspect said output to validate support for said first activity in said later version of said CRM system.

2. The method of claim 1, wherein said set of database elements contains a renamed element in said later version corresponding to a old element in said earlier version, wherein said input data contains a value for said old element in said earlier version, wherein said application is operable to store said value to said renamed element in said difference database in response to said user having provided said value for said old element while demonstrating how said first activity would be operative in said later version of said CRM system.

3. The method of claim 2, wherein said set of database elements contains a new element, wherein said difference indicates that said new element has a relationship with said renamed element, wherein said application is operable to create an instance of said new element in said difference database in response to said input data.

4. The method of claim 3, wherein said input data, upon processing by said CRM system, is designed to be stored in said first database, said method further comprising:

receiving an indication that said first activity is sought to be provided to said application, wherein said application is operable to copy said value from said old element to said renamed element in said difference database in response to said indication.

5. The method of claim 1, wherein said plurality of differences contain a difference in a program logic implemented in said later version as compared to said earlier version, wherein said application is operable to perform the same program logic as said later version in processing said input data.

6. A non-transitory machine readable medium storing one or more sequences of instructions for causing a system to enable users to validate support for specific activities in a customer relationship management (CRM) system before migration from an earlier version to a later version of said CRM system, wherein said CRM system of said earlier version is operational before said migration based on a first database while providing a first set of user interface to users, wherein execution of said one or more sequences of instructions by one or more processors contained in said system causes said system to perform the actions of:

receiving from a user, an input data which is designed to make operative a first activity supported by said earlier version, wherein said first activity is contained in said set of activities,     wherein said input data is received according to a second set of user interfaces according to said later version, wherein said second set of interfaces are different compared to those in said first version; and     processing said input data to perform said first activity and generate an output for said user, wherein said processing is designed to operate based on both of said first database and a difference database together,     wherein said output is generated for said user also according to said second set of user interfaces, wherein said second set of user interface are different compared to those in said first version with respect to said first activity,     said difference database being designed according to a difference schema, said difference schema containing a set of database elements contained in a second database that are not present in said first database, said later version being designed to operate based on said second database, wherein said output can be inspected by an user to validate support for said first activity in said later version,     wherein said one or more sequences of instructions constitute an application used to demonstrate how activities according to said earlier version would be operative in said later version of said CRM system.

7. The machine readable medium of claim 6, wherein said set of database elements contains a renamed element in said later version corresponding to a old element in said earlier version,     wherein said input data contains a value for said old element in said earlier version,     wherein said system is operable to store said value to said renamed element in said difference database in response to said user having provided said value for said old element while demonstrating how said first activity would be operative in said later version of said CRM system.

8. The machine readable medium of claim 6, wherein said plurality of differences contain a difference in a program logic implemented in said later version as compared to said earlier version,     wherein said system is operable to perform the same program logic as said later version in processing said input data.

9. A computing system for demonstrating how a set of activities according to an earlier version of a customer relationship management (CRM) system would be operative in a later version of said CRM system, said computing system comprising:

a first database based on which said earlier version of said CRM system operates;

a difference database designed according to a difference schema, said difference schema containing a set of database elements contained in a second database that are not present in said first database, said later version being designed to operate based on said second database;

a processor; a random access memory (RAM); and a machine readable medium storing a set of instructions which when retrieved into said RAM and executed by said processor causes said system to perform a plurality of actions comprising:

receiving from a user, an input data which is designed to make operative a first activity supported by said earlier version, wherein said first activity is contained in said set of activities, wherein said input data is received according to a second set of user interfaces according to said later version; and         processing said input data to perform said first activity and generate an output for said user, wherein said processing is designed to operate based on both of said first database and said difference database together,     wherein said output is also generated for said user according to said second set of user interfaces, wherein said second set of user interfaces are different compared to those in said first version with respect to said first activity,     wherein said output can be inspected by an user to validate support for said first activity in said later version,     wherein said set of instructions constitute an application used to demonstrate how activities according to said earlier version would be operative in said later version of said CRM system.

10. The computing system of claim 9, wherein said set of database elements contains a renamed element in said later version corresponding to a old element in said earlier version, wherein said set of database elements contains a new element, wherein said difference indicates that said new element has a relationship with said renamed element,     wherein said input data contains a value for said old element in said earlier version,     said plurality of actions further comprising:

storing said value to said renamed element in said difference database; and     creating an instance of said new element in said difference database in response to said input data.

11. The computing system of claim 10, wherein said set of database elements contains a new element, wherein said difference indicates that said new element has a relationship with said renamed element,     wherein said application is operable to create an instance of said new element in said difference database.

12. The computing system of claim 11, wherein said input data, upon processing by said CRM system, is designed to be stored in said first database, said plurality of actions further comprising:

receiving an indication that said first activity is sought to be provided to said application,     copying said value from said old element to said renamed element in said difference database in response to said indication.

13. The computing system of claim 10, wherein said plurality of differences contain a difference in a program logic implemented in said later version as compared to said earlier version,     wherein said digital processing system is operable to perform the same program logic as said later version in processing said input data.

* * * * *